United States Patent [19]

Biglione et al.

[11] 4,020,022
[45] Apr. 26, 1977

[54] PROCESS FOR PRODUCING PARTICLES OF EXPANDABLE STYRENE POLYMERS AND ARTICLES OF CELLULAR STRUCTURE FORMED FROM SAID PARTICLES

[75] Inventors: Gianfranco Biglione; Antonio Alvares, both of Mantova; Guido Bertazzoni, Campitello di Marcaria (Mantova), all of Italy

[73] Assignee: Montedison Fibre S.p.A., Milan, Italy

[22] Filed: Aug. 12, 1975

[21] Appl. No.: 603,812

Related U.S. Application Data

[63] Continuation of Ser. No. 470,856, May 17, 1974, abandoned.

[52] U.S. Cl. .................. 260/2.5 HB; 260/2.5 B; 260/878 R
[51] Int. Cl.$^2$ ........................................ C08J 9/22
[58] Field of Search ................. 260/2.5 B, 2.5 HB

[56] References Cited

UNITED STATES PATENTS

| | | | |
|---|---|---|---|
| 3,468,820 | 9/1969 | Buchholtz et al. | 260/2.5B |
| 3,558,534 | 1/1971 | Niechwiadowicz et al. | 260/2.5 B |
| 3,657,163 | 4/1972 | Kishikawa et al. | 260/2.5 B |
| 3,682,844 | 8/1972 | Schwoegler et al. | 260/2.5 B |

Primary Examiner—Morton Foelak

[57] ABSTRACT

Polymers of styrene or copolymers thereof with monomers copolymerizable therewith are obtained in the form of expandable particles by polymerizing the styrene or mixture of monomers comprising styrene in the presence of an elastomeric olefinic copolymer or terpolymer, incorporating an expanding agent during or after the polymerization, ageing the preexpanded particles, and molding the pre-expanded and aged particles in a pressure-resistant mold which is not gas tight to obtain molded articles having very desirable characteristics.

12 Claims, No Drawings

PROCESS FOR PRODUCING PARTICLES OF EXPANDABLE STYRENE POLYMERS AND ARTICLES OF CELLULAR STRUCTURE FORMED FROM SAID PARTICLES

This is a continuation of application Ser. No. 470,856 filed May 17, 1974, and now abandoned.

THE PRIOR ART

It is known to obtain shaped bodies or articles based on foamed styrene polymers by molding fine particles of the polymers containing gaseous or liquid expanding agents in closed (but not gas-tight) molds and operating at temperatures exceeding the boiling point of the foaming agent and the softening point of the polymeric material.

According to the procedure commonly followed, the polymer particles containing the foaming agent are first heated (pre-expansion step) in either a closed or open vessel until reaching a pre-fixed apparent density and then, after a suitable ageing period, the particles are further expanded by heating in a mold which is pressure resistant but not gas-tight.

During the last-mentioned heat-treatment, the particles sinter to form a body or article having the shape of the mold.

After such molding, the shaped body is allowed to cool in the mold for a time sufficiently long to avoid distortions of the molded body during and after it is removed from the mold.

Normally, a rather long residence time of the pre-expanded particles in the mold is required. To reduce such residence time, it has been suggested to incorporate various substances with the styrene polymer particles containing the foaming or expanding agent.

Most of the additives suggested for that purpose, while resulting in some, even in certain cases, an appreciable reduction in the residence time in the mold, have had other drawbacks and disadvantages, notably the fact that, in practice, it has not been possible to attain with them both a reduction of the residence time and the production of molded bodies having optimum physical characteristics.

THE PRESENT INVENTION

One object of this invention is to provide a process which is free of the drawbacks and disadvantages of the prior art processes and by which it is possible to reduce the residence time in the mold for the cooling of the blocks prepared from pre-expanded particles and also obtain molded bodies having excellent physical properties.

That and other objects which will appear hereinafter is achieved by the process of this invention and in accordance with which the polymerization of styrene or of mixtures thereof with monomers copolymerizable with it, is carried out in the presence of elastomeric olefinic copolymers of ethylene and propylene and/or elastomeric terpolymers of ethylene, propylene and diene hydrocarbons, expanding agents being added either during or after, and preferably during the polymerization, the expandable particles thus obtained are pre-expanded, ageded, and then molded in a mold which is pressure-resistant but not gas-tight.

The amount of elastomeric olefinic copolymer or terpolymer present during the polymerization step is from 0.001 to 1%, preferably from 0.05 to 0.5 parts % by weight.

We have found that the shaped molded bodies, and more particularly, molded blocks obtained by the present process have, at the same time, the following characteristics:

a. a short residence time in the mold, in general equal to and even less than 50% of the residence time which is necessary for cooling of blocks and molded of the pre-expanded particles which do not contain an elastomeric olefinic copolymer and/or terpolymer as used in the present process;

b. shrinkage of the block (in thickness) $\leq 1\%$; and c. a high degree of sintering.

The elastomeric olefinic copolymers and terpolymers used in the practice of this invention can be selected from a wide range of such polymeric materials. Particularly good results are obtained by using elastomeric ethylene/propylene, copolymers containing from 10 to 90% by weight of ethylene and having an inherent viscosity, measured on a 0.25% solution of the elastomeric copolymer in tetralin at 1350° C, of from 0.25 to 4.0.

Similarly good results are also obtained using elastomeric terpolymers of ethylene, propylene and a dienic hydrocarbon such as dicyclopentadiene, 1,4-hexadiene, methylnorbornene, methyltetrahydroindene, butenylnorbornene, ethylidene-norbornene and the like, containing from 30 to 70% by weight of ethylene, from 70 to 30% by weight of propylene, and from 0.01 up to 15% by weight of the diene.

A presently preferred terpolymer is one in which the diene is ethylidene-norbornene (ethylene, propylene, ethylidene-norbornene ratios by weight : 50/47/3) and having an inherent viscosity, measured on a 0.25% solution of the terpolymer in tetralin at 135° C, of about 1.8.

The olefinic elastomeric copolymers and/or terpolymers are mixed with the styrene or mixture of styrene and monomers copolymerizable therewith prior to the polymerization, or during the polymerization, and may be added in admixture with the expanding agents.

As used herein, and as disclosed above, the term "styrene polymer" includes the homopolymer, polystyrene, as well as copolymers of styrene with other monomers copolymerizable therewith. The copolymers may be copolymers of styrene with other vinyl and/or vinylidene monomers which contain at least 50% by weight of chemically combined styrene.

Examples of useful comonomers include alpha-methylstyrene, nuclearly halogenated styrenes, acrylonitrile, metacrylonitrile, esters of acrylic and/or metacrylic acids with alcohols containing from 1 to 8 carbon atoms and N-vinyl-compounds such as vinylcarbazole. This class of styrene copolymers also includes those copolymers which, besides styrene and vinyl and/or vinylidene monomers of the type aforementioned, also contain small quantities of monomers containing double bonds, such as, for instance, divinylbenzene.

The compounds to be used as expanding agents for the styrene polymers may be selected from a wide range of compounds the characteristics of which are known to the skilled in the art.

Particularly suitable are aliphatic hydrocarbons, alone or in suitable mutual admixtures, containing from 2 to 6 carbon atoms, such as: propane, butane, pentane, hexane, cyclohexane and the like, and the halogenated derivatives of aliphatic hydrocarbons containing from 1 to 3 carbon atoms, such as, for instance, chlorofluorine derivatives of methane, ethane and ethylene.

Besides the expanding agents, the styrene polymers according to this invention may contain other adjuvants, such as, for instance, flame extinguishing agents, non-agglomerating agents to prevent the formation of crumbs in the pre-expansion step, plasticizers and other such like compounds.

The polymerization of styrene or mixture thereof with other monomers, preferably in an aqueous suspension, the addition of the expanding agent, preferably during the polymerization, the pre-expansion of the expandable particles thus obtained, the ageing and the transformation of the pre-expanded and aged particles into shaped bodies, by molding in closed molds, are carried out according to techniques well known to the skilled in the art, such as those, for instance, described in "Rigid Plastic Foams" by T. N. Ferrigno, Reinhold Publishing Corp., New York — USA, (1963).

The following examples are given to illustrate the essential characteristics of this invention and are not intended to be limiting.

Various aqueous suspension polymerization tests were carried out starting from mixtures consisting of:

|  | Parts By Wt. |
|---|---|
| monomeric styrene | 100 |
| deionized water | 100 |
| polymerization initiator (1) | 0.20 |
| suspending agent (2) | 0.05 |
| NaCl | 0.1 |
| olefinic elastomer copolymer (3) | as hereinunder indicated |

(1) mixture of tert.-butylperoxide and tert-butyl-perbenzoate
(2) acryl acid/2-ethylhexylacrylate copolymer (ratio by weight 89/11).
(3) different types of olefinic elastomer copolymers, more particularly:

(a) ethylene/propylene copolymer containing 50% b.w. of chemically combined ethylene, with an inherent viscosity, measured at 135° C in a 0.25% b.w. solution of polymer in tetralin, equal to 0.96.

(b) ethylene/propylene copolymer containing 50% b.w. of ethylene with an inherent viscosity of 0.6.

(c) ethylene/propylene/ethylidenenorbornene elastomeric olefinic terpolymer (ratios by weight: 50/47/3), with an inherent viscosity equal to 1.8.

(d) ethylene/propylene/dicyclopentadiene olefinic terpolymer (ratios by weight: 61/35/4) with a Mooney viscosity of about 53.

(e) polybutadiene rubber of the type known commercially as Intene NF35A.

Compounds (a), (b), (c) and (d), are according to this invention, while compound (e) is given for comparative purposes.

The polymerization was carried out at temperatures varying from 100° to 140° C for a total time of 20 hours.

During the polymerization, 8 parts by weight of an expanding agent were added consisting of a mixture of n-pentane and isopentane (ratio by weight = 70/30).

After cooling to room temperature, filtering, washing with water and drying for 7 hours at 35° – 40° C, the polymer was screened so as to obtain expandable polystyrene particles with a diameter comprised between 0.9 and 1.6 mm.

Said particles have an expanding agent content of about 6% by weight.

The expandable particles were mixed with a conventional non-agglomerating agent, in amounts equal to 0.15% by weight.

The admixing was carried out in a SAGA screw-mixer, at room temperature for about 10 minutes.

The expandable particles thus treated were fed into a pre-expander (Erlenbach Mod. K2) type with screw-inlet on the bottom and outlet of the pre-swollen material from the top, wherein said particles were pre-expanded for about 5 minutes with steam at 95° – 100° C.

The pre-expanded particles were then allowed to age in air at room temperature for about 24 hours.

The pre-expanded and aged particles were thereupon loaded into a blockmaking press of the Rauscher type, until the 100 × 100 × 50 cm cavity of the mold was filled. The molding was carried out with steam at 1 atm.

The cooling time for the blocks is the time required for the pressure inside the blocks to drop to zero after stopping the steam treatment.

After 48 hours from the molding, the shrinkage and the degree of sintering of the blocks was determined. This latter characteristic was evaluated on a 2 cm thick plate obtained by hot-slinging from the central part of the block, and was determined as the % of expanded particles that broke when the plate was broken.

The characteristics of the expandable particles and of the molded blocks thus obtained are reported in the following Table.

TABLE

| Type of elastomeric olefine copolymer | — | a | b | c | d | e |
|---|---|---|---|---|---|---|
| Quantity % by weight | — | 0.1 | 0.1 | 0.25 | 0.25 | 0.1 |
| Properties of the molded block |  |  |  |  |  |  |
| Density in kg/cu.cm | 20 | 20 | 20 | 20 | 20 | 20 |
| Cooling time of blocks, in minutes | 60 | 30 | 27 | 30 | 30 | 45 |
| Shrinkage of the block (as thickness), % | 1 | 1 | 1 | 1 | 1 | 1 |
| Degree of sintering, in % | 70 | 70 | 70 | 70 | 70 | 70 |

As is apparent from the data of the preceding table, blocks molded with a low cooling time are obtained only when using elastomeric olefinic copolymers and terpolymers of the types (a), (b), (c) or (d), according to the invention, while in the other cases molded blocks are obtained with considerably higher cooling down times.

We claim:

1. Process for the preparation of shaped bodies based on expanded styrene polymers comprising, in the given order: the polymerization of styrene or a mixture thereof with at least one monomer copolymerizable therewith, the addition of an expanding agent, pre-expansion of the resulting expandable particles, ageing of the pre-expanded particles, and molding thereof in a pressure resistant and non gas-tight mold, characterized in that the polymerization is carried out in the presence of 0.001 to 1% parts by weight of at least one elastomeric olefinic copolymer selected from the group consisting of elastomeric binary copolymers of ethylene and propylene and elastomeric terpolymers of ethylene, propylene and a diene.

2. The process according to claim 1, characterized in that the elastomeric olefinic copolymer is an ethylene-propylene copolymer containing from 10% to 90% by weight of ethylene and having an inherent viscosity comprised between 0.25 and 4.

3. The process according to claim 1, characterized in that the elastomeric olefinic copolymer is a terpolymer of ethylene, propylene and ethylidene-norbornene containing from 30 to 70% by weight of ethylene, from 70 to 30% by weight of propylene and from 0.01 to 15% by weight of ethylidene-norbornene.

4. The process according to claim 1, characterized in that the styrene polymer is polystyrene.

5. The process according to claim 1, characterized in that the styrene polymer is a copolymer of styrene with a vinyl monomer copolymerizable therewith and containing at least 50% by weight of chemically combined styrene.

6. The process according to claim 1, characterized in that the styrene polymer is a copolymer of styrene with a vinylidene monomer copolymerizable therewith and containing at least 50% by weight of chemically combined styrene.

7. Expandable particles of a styrene polymer and obtained by the process of claim 1.

8. Shaped molded bodies of an expandable styrene polymer and obtained by the process of claim 1.

9. Expandable particles of a styrene copolymer obtained by the process of claim 5.

10. Expandable particles of a styrene copolymer and obtained by the process of claim 6.

11. Shaped molded bodies of an expandable styrene copolymer and obtained by the process of claim 5.

12. Shaped molded bodies of an expandable styrene copolymer and obtained by the process of claim 6.

* * * * *

UNITED STATES PATENT OFFICE
CERTIFICATE OF CORRECTION

Patent No. 4,020,022  Dated April 26, 1977

Inventor(s) Gianfranco BIGLIONE et al

It is certified that error appears in the above-identified patent and that said Letters Patent are hereby corrected as shown below:

On the Title page,

(73) The printed patent gives Montedison Fibre S.p.A., Milan, Italy as the assignee whereas the correct assignee is -- Montedison S.p.A., Milan, Italy --.

The following should be added

--/30/Foreign Application Priority Data

May 18, 1973       Italy         24,272A/73 --.

The Table at columns 3-4 should read as shown on the attached sheet.

Signed and Sealed this

Eighth Day of May 1979

[SEAL]

Attest:

RUTH C. MASON  
Attesting Officer

DONALD W. BANNER  
Commissioner of Patents and Trademarks

TABLE

| | | a | b | c | d | e |
|---|---|---|---|---|---|---|
| Type of elastomeric olefine copolymer | – | | | | | |
| Quantity % by weight | – | 0.1 | 0.1 | 0.25 | 0.25 | 0.1 |
| Properties of the molded block | | | | | | |
| Density in kg/cu.cm | 20 | 20 | 20 | 20 | 20 | 20 |
| Cooling time of blocks, in minutes | 60 | 30 | 27 | 30 | 30 | 45 |
| Shrinkage of the block (as thickness), % | <1 | <1 | <1 | <1 | <1 | <1 |
| Degree of sintering, in % | 70 | 70 | 70 | 70 | 70 | 70 |